US012566571B2

(12) United States Patent
Tu et al.

(10) Patent No.: US 12,566,571 B2
(45) Date of Patent: Mar. 3, 2026

(54) COMMUNICATION DEVICE AND METHOD FOR HANDLING A DATA TRANSMISSION

(71) Applicant: MEDIATEK INC., Hsin-Chu (TW)

(72) Inventors: Tang-Hsun Tu, Hsinchu City (TW);
I-Chih Lu, Hsinchu City (TW);
Han-Cheng Shih, Hsinchu City (TW);
Liang-Gu Liu, Hsinchu City (TW);
Shen-Lung Liu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/628,822

(22) Filed: Apr. 8, 2024

(65) Prior Publication Data

US 2025/0315186 A1 Oct. 9, 2025

(51) Int. Cl.
G06F 3/06 (2006.01)

(52) U.S. Cl.
CPC .......... G06F 3/0656 (2013.01); G06F 3/0604 (2013.01); G06F 3/0679 (2013.01)

(58) Field of Classification Search
CPC ..... G06F 3/0656; G06F 3/0604; G06F 3/0679
See application file for complete search history.

(56) References Cited

U.S. PATENT DOCUMENTS

| | | | |
|---|---|---|---|
| 2017/0068640 A1 | 3/2017 | Shahar | |
| 2020/0125435 A1* | 4/2020 | Sundrani | G06F 11/1443 |
| 2024/0095193 A1* | 3/2024 | Suzuki | G06F 13/1626 |
| 2024/0211387 A1* | 6/2024 | Cho | G06F 12/0868 |
| 2024/0402939 A1* | 12/2024 | Pereira | G06F 3/064 |

* cited by examiner

*Primary Examiner* — Hiep T Nguyen
(74) *Attorney, Agent, or Firm* — Winston Hsu

(57) ABSTRACT

A host communication device includes a memory and a processing circuit. The memory includes a plurality of host buffers. The processing circuit is coupled to the memory and configured to execute instructions of: transmitting memory information associated with at least one host buffer in the memory to a transmitting communication device; receiving data from the transmitting communication device, wherein the at least one host buffer stores the data according to the memory information after the processing circuit receives the data; transmitting data information associated with the data to a receiving communication device; and transmitting the data stored in the at least one host buffer to the receiving communication device according to the data information.

20 Claims, 5 Drawing Sheets

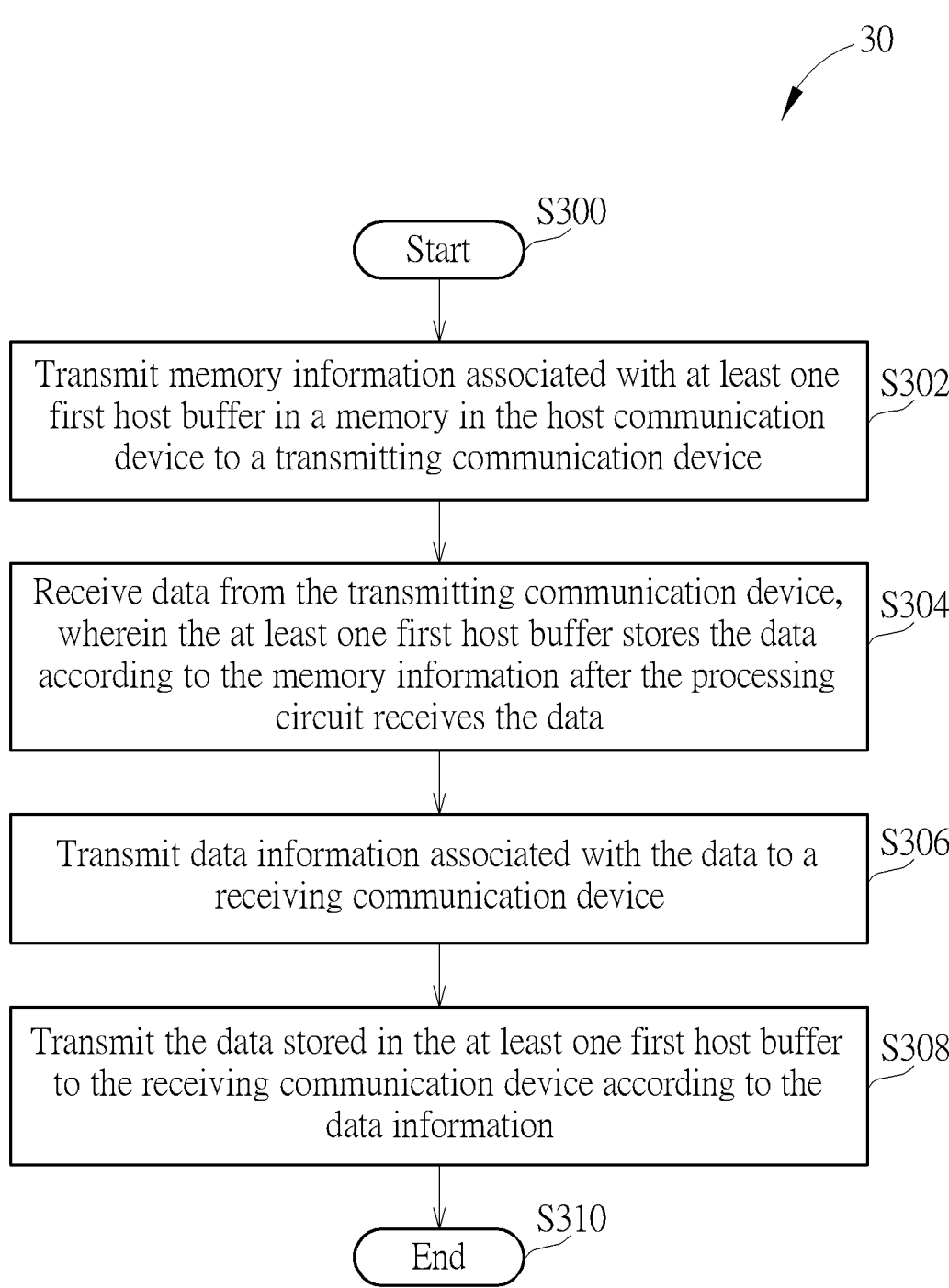

_30_

S300

Start

Transmit memory information associated with at least one
first host buffer in a memory in the host communication
device to a transmitting communication device                    S302

Receive data from the transmitting communication device,
wherein the at least one first host buffer stores the data
according to the memory information after the processing
circuit receives the data                                        S304

Transmit data information associated with the data to a
receiving communication device                                   S306

Transmit the data stored in the at least one first host buffer
to the receiving communication device according to the
data information                                                  S308

S310
End

FIG. 3

COMMUNICATION DEVICE AND METHOD FOR HANDLING A DATA TRANSMISSION

BACKGROUND

In some specific communication scenario, data is communicated between wireless communication devices via a host communication device. During the data transmission, a central processing unit (CPU) in the host communication device acts as a transmission engine to move the data between the wireless communication devices. However, the data transmission executed by the CPU introduces additional power consumption, increased latency and software complexity as the data path involves more components.

SUMMARY

It is an objective of the invention to provide communication devices, in order to solve the above problem.

An embodiment of the invention provides a host communication device comprising a memory and a processing circuit. The memory comprises a plurality of host buffers. The processing circuit is coupled to the memory and configured to execute instructions of: transmitting memory information associated with at least one host buffer in the memory to a transmitting communication device; receiving data from the transmitting communication device, wherein the at least one host buffer stores the data according to the memory information after the processing circuit receives the data; transmitting data information associated with the data to a receiving communication device; and transmitting the data stored in the at least one host buffer to the receiving communication device according to the data information.

An embodiment of the invention provides a transmitting communication device comprising a memory and a processing circuit. The memory comprises a plurality of host buffers. The processing circuit is coupled to the memory and configured to execute instructions of: receiving memory information associated with at least one host buffer in a host communication device from the host communication device; transmitting data to the host communication device according to the memory information, wherein the data is stored in at least one internal buffer in the memory and the at least one second buffer corresponds to the at least one host buffer; transmitting a first indication indicating a transmission completion of the data to a receiving communication device, after transmitting the data to the host communication device; receiving a second indication for recycling the at least one host buffer from the receiving communication device; and recycling the at least one host buffer according to the second indication.

An embodiment of the invention provides a receiving communication device comprising a memory and a processing circuit. The memory comprises a plurality of host buffers. The processing circuit is coupled to the memory and configured to execute instructions of: receiving a first indication indicating a transmission completion of data from a transmitting communication device, wherein the data is transmitted from the transmitting communication device to a host communication device and stored in at least one host buffer in the host communication device; receiving data information associated with the data from the host communication device; receiving the data from the host communication device according to the data information in response to the first indication; and transmitting a second indication for recycling the at least one host buffer to the transmitting communication device, after receiving the data from the host communication device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a flowchart of a process according to an embodiment of the invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
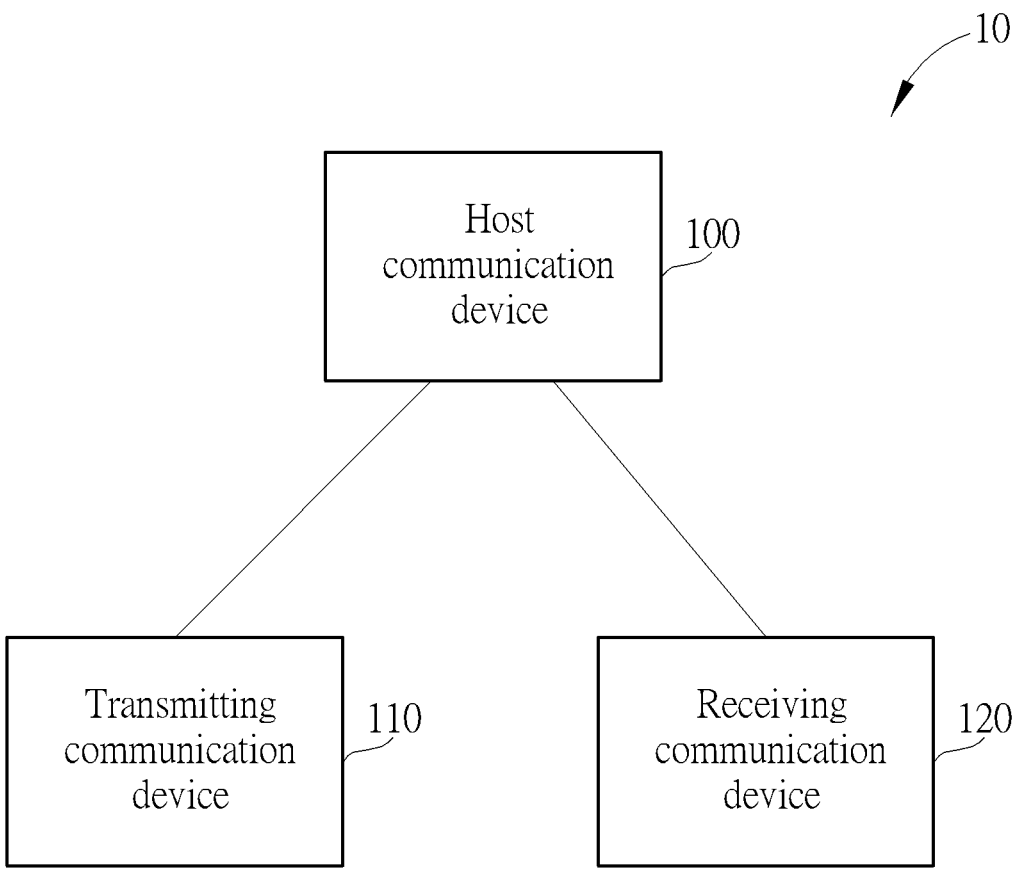
FIG. 1 is an exemplary block diagram of a wireless communication system according to an embodiment of the invention.

FIG. 1 is an exemplary block diagram of a wireless communication system 10 according to an embodiment of the invention. The wireless communication system 10 may be a computer system or an embedded system, and equips multiple wireless communication devices. In FIG. 1, the communication system 10 is briefly composed of a host communication device 100, a transmitting communication device 110 and a receiving communication device 120. The host communication device 100, the transmitting communication device 110 and the receiving communication device 120 may communicate with each other via one or multiple carriers of licensed band(s) and/or unlicensed band(s). The host communication device 100, the transmitting communication device 110 and the receiving communication device 120 may communicate with each other via one or multiple cells (e.g., one or multiple carriers) belonging to one or multiple base stations (BSs). The abovementioned cells may be operated in the same or different duplexing modes, i.e., frequency-division duplexing (FDD), time-division duplexing (TDD) and flexible duplexing.

In FIG. 1, the wireless communication system 10 may be applied in a wireless network and/or in an access network (e.g., a cellular network, a terrestrial network (TN), a non-terrestrial network (NTN), a wireless local area network (WLAN), a personal area network (PAN), a wireless local access network, or combination thereof). In an embodiment of the invention, the wireless communication system 10 is applied in the cellular network and Wi-Fi. In an embodiment of the invention, the host communication device 100, the transmitting communication device 110 and the receiving communication device 120 may communicate with each other according to a tethering function, but not limited herein. The host communication device 100 with the tethering function may share cellular connections with the transmitting communication device 110 and the receiving communication device 120 via a Wi-Fi hotspot. In an embodiment of the invention, the transmitting communication device 110 transmits data (e.g., packet(s), signal(s), event(s), message(s) and/or command(s)) to the host communication device 100 via a connection provided by the tethering function, and then the host communication device 100 forwards the data to the receiving communication device 120 via another connection provided by the tethering function.

In an embodiment of the invention, the host communication device 100 supports the transmitting communication device 110 and the receiving communication device 120. For example, the transmitting communication device 110 and the receiving communication device 120 may communicate with each other via a memory in the host communication device 100. In detail, by putting commands on the memory in the host communication device 100, the transmitting communication device 110 and the receiving communication device 120 may directly communicate data with each other. In an embodiment of the invention, the transmitting communication device 110 and the receiving communication device 120 define the control interface by receiving commands from the memory in the host communication device 100.

The host communication device 100 may be a user equipment (UE), a mobile phone, an access point (AP) or a router (e.g., a Mi-Fi product), but is not limited herein. The transmitting communication device 110 or the receiving communication device 120 may be a UE, a device-to-device (D2D) communication device, a peripheral component interconnect express (PCIe) device, a low cost universal asynchronous receiver/transmitter (UART), an Internet of Thing (IoT) device, a mobile phone, a laptop, a tablet computer, an electronic book, a portable computer system, a vehicle, a ship or an aircraft, but is not limited herein.

Figure 2:
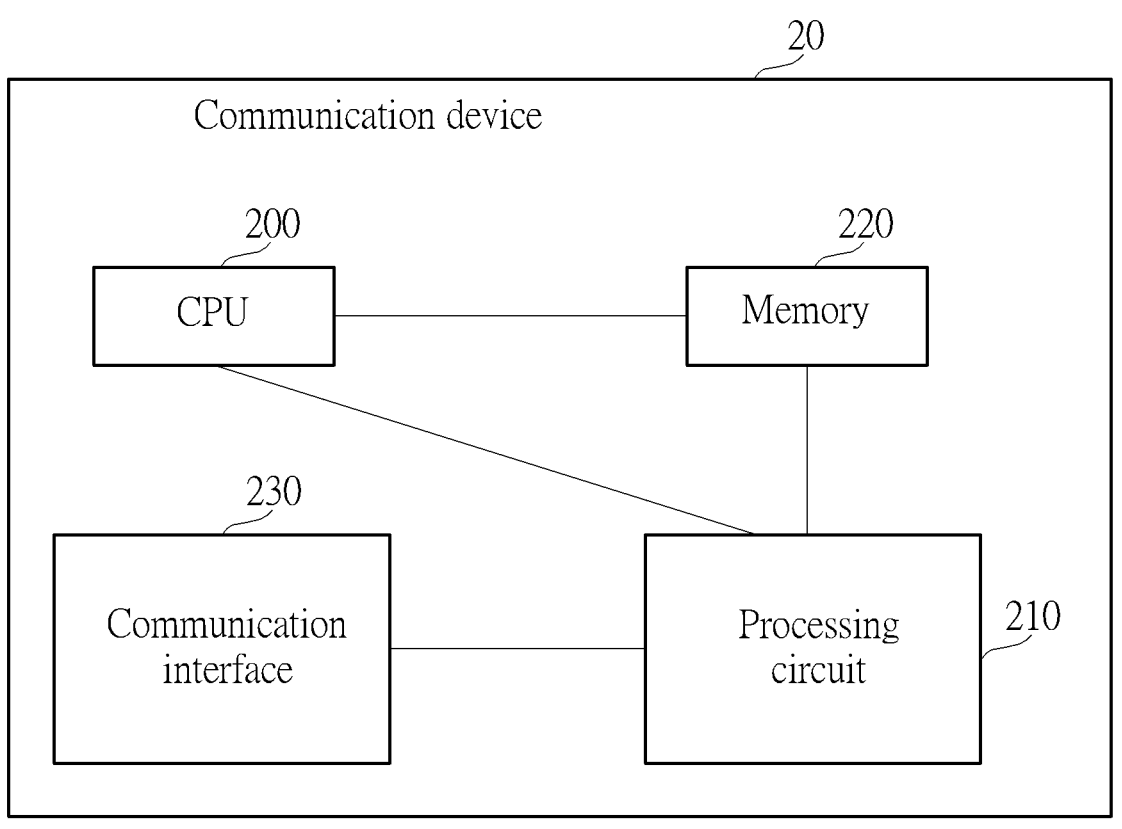
FIG. 2 is an exemplary block diagram of a communication device according to an embodiment of the invention.

FIG. 2 is an exemplary block diagram of a communication device 20 according to an embodiment of the invention. The communication device 20 may be the host communication device 100, the transmitting communication device 110 or the receiving communication device 120 shown in FIG. 1, but is not limited herein. The communication device 20 comprises a central processing unit (CPU) 200, a processing circuit 210, a memory 220, and a communication interface 230. The CPU 200 is a main processor such as a microprocessor or an application specific integrated circuit (ASIC) in the communication device 20, and is configured to perform arithmetic operations and logical operations, allowing the electronic device 10 to perform various tasks (e.g., basic software operations and/or complex calculations).

The processing circuit 210 coupled to the CPU 200 comprises (e.g., is) a software or circuit module such as tAgent or dAgent, and is configured to communicate with other communication devices via the memory 220 (e.g., initialize the tethering function to other communication devices). In an embodiment of the invention, a processing circuit in the host communication device 100 is tAgent. tAgent is used to setup communications between other communication devices (e.g., the transmitting communication device 110 and the receiving communication device 120 in FIG. 1). In an embodiment of the invention, a processing circuit in the transmitting/receiving communication device 110/120 is dAgent. dAgent is used to define control event to support the tethering function, support events passing with other communication devices and handles events from other communication devices.

The memory 220 coupled to the CPU 200 and the processing circuit 210 is any data storage device that may store data received from other communication device and may further store instructions/operations executed by the processing circuit 210. Examples of the memory 220 include, but are not limited to, read-only memory (ROM), flash memory, random-access memory (RAM), dynamic random-access memory (DRAM), compact disc read-only memory (CD-ROM), etc. The memory 220 comprises a plurality of buffers (not shown). In an embodiment of the invention, a memory in the host communication device 100 comprises a plurality of host buffers. In an embodiment of the invention, a memory in the transmitting/receiving communication device 110/120 comprises a plurality of internal buffers. The communication interface 230 coupled to the processing circuit 210 comprises at least one transceiver, and is configured to transmit and receive data according to processing results of the processing circuit 210. The communication interface 230 may further comprise a PCIe interface. In an embodiment of the invention, the communication device 20 further comprises a connection tracker (not shown) coupled to the processing circuit 210. The connection tracker such as a tethering connection tracker is configured to determine (e.g., define) a connection rule for the communication device 20.

FIG. 3 is a flowchart of a process 30 utilized in a host communication device (e.g., the host communication device 100 in FIG. 1, and more particularly, a processing circuit in the host communication device 100) according to an embodiment of the invention, to handling a data transmission. Provided that the result is substantially the same, the steps are not required to be executed in the exact order shown in FIG. 3. The process 30 comprises the following steps:

Step S300: Start.

Step S302: Transmit memory information associated with at least one first host buffer in a memory in the host communication device to a transmitting communication device (e.g., the transmitting communication device 110 in FIG. 1).

Step S304: Receive data from the transmitting communication device, wherein the at least one first host buffer stores the data according to the memory information after the processing circuit receives the data.

Step S306: Transmit data information associated with the data to a receiving communication device (e.g., the receiving communication device 120 in FIG. 1).

Step S308: Transmit the data stored in the at least one first host buffer to the receiving communication device according to the data information.

Step S310: End.

The processing circuit in the host communication device 100 is configured to perform steps of the process 30. According to the process 30, the data is transmitted from the transmitting communication device to the receiving communication device via the memory in the host communication device. During the data transmission, a CPU in the host communication device does not wake up. That is, the CPU in the host communication device is (configured to be) in a power off state when the processing circuit in the host communication device executes the steps of the process 30.

Realization of the process 30 is not limited to the above description. The following embodiments of the invention may be applied to realize the process 30.

In an embodiment of the invention, the processing circuit in the host communication device allocates host buffers in the memory, e.g., in response to a tethering function being enabled. For example, the processing circuit in the host communication device allocates the at least one first host buffer for a first communication between the transmitting communication device and the receiving communication device. For example, the processing circuit in the host communication device allocates at least one second host buffer in the memory for a second communication between the host communication device and the transmitting communication device. For example, the processing circuit in the host communication device allocates at least one third host buffer in the memory for a third communication between the host communication device and the receiving communication device.

In an embodiment of the invention, the processing circuit in the host communication device establishes communication channels between the host communication device and other communication devices (e.g., other processing circuits in the other communication devices), after allocating the host buffers in the memory. For example, the processing circuit in the host communication device establishes a first communication channel between the host communication device and the transmitting communication device. For example, the processing circuit in the host communication device establishes a second communication channel between the host communication device and the receiving communication device.

In an embodiment of the invention, a connection tracker in the host communication device determines (e.g., defines) a connection rule and generates connection information of the connection rule. In an embodiment of the invention, the processing circuit in the host communication device transmits the connection information to the transmitting communication device and the receiving communication device, e.g., whenever a connection matches the connection rule. In an embodiment of the invention, the connection rule is enabled for a direct tethering. In an embodiment of the invention, the connection information comprises at least one source address of the data and at least one destination address of the data. For example, the connection information comprises at least one host address of the memory in the host communication device, at least one internal address of a memory in the transmitting communication device and/or at least one internal address of a memory in the receiving communication device.

In an embodiment of the invention, the processing circuit in the host communication device receives at least one description from the transmitting communication device, and transmits the at least one description to the receiving communication device. In an embodiment of the invention, each of the at least one description comprises a pointer of one or multiple host buffers in the host buffer region. That is, a description of the at least one description corresponds to one or multiple host address for the host communication device. In an embodiment of the invention, each of the at least one description is put consecutively like a ring buffer with a fixed entry size in the memory in the host communication device. In an embodiment of the invention, the at least one description is mirrored in memories in the host communication device and the transmitting/receiving communication device.

In an embodiment of the invention, the data comprises at least one packet, at least one signal, at least one event, at least one message or at least one command. In an embodiment of the invention, the memory information comprises at least one memory location (e.g., host address) of the at least one host buffer. In an embodiment of the invention, the data information comprises a size of the data (e.g., the number of events/packets to receive).

Figure 4:
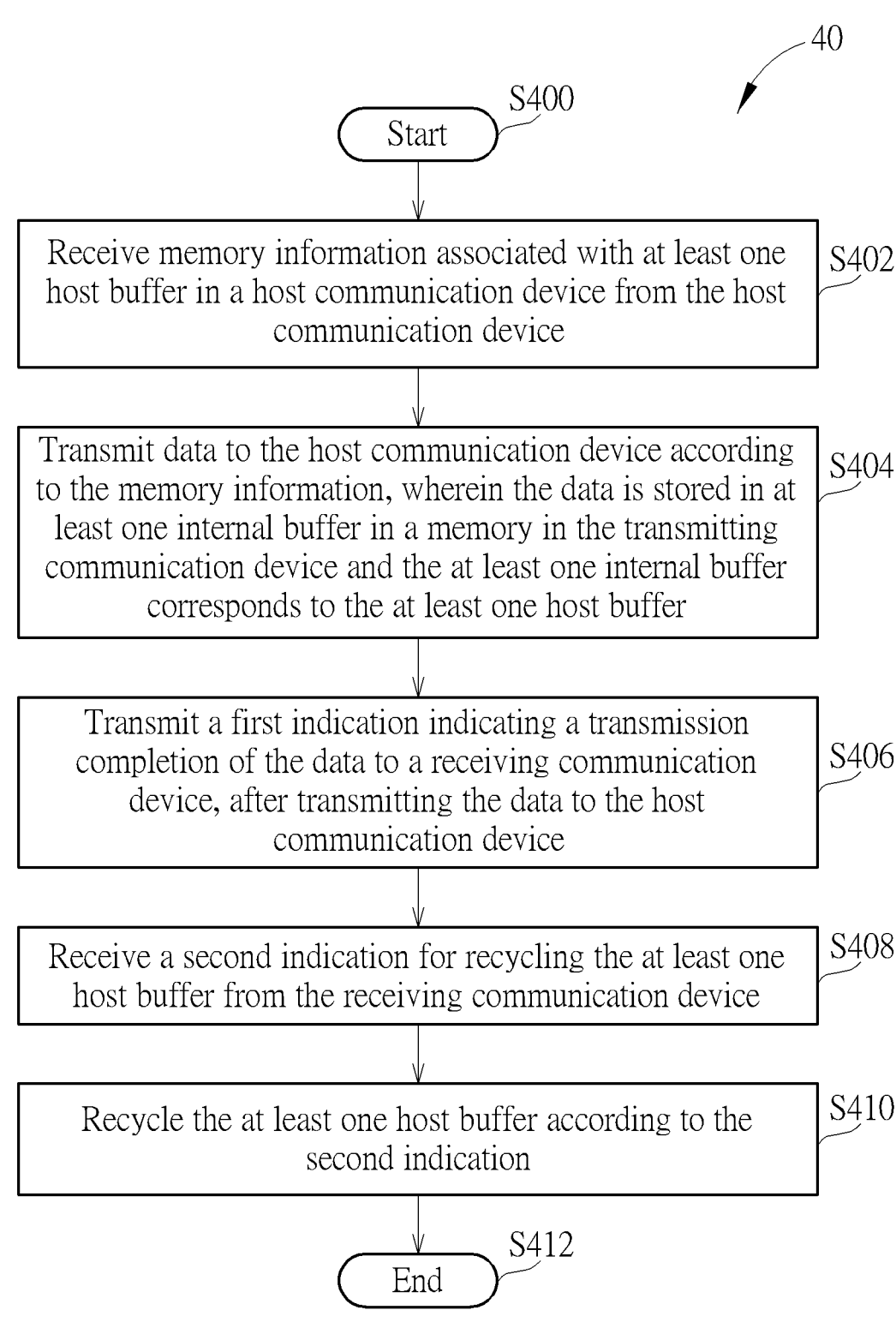
FIG. 4 is a flowchart of a process according to an embodiment of the invention.

FIG. 4 is a flowchart of a process 40 utilized in a transmitting communication device (e.g., the transmitting communication device 110 in FIG. 1, and more particularly, a processing circuit in the transmitting communication device 110) according to an embodiment of the invention, to handling a data transmission. Provided that the result is substantially the same, the steps are not required to be executed in the exact order shown in FIG. 4. The process 40 comprises the following steps:

Step S400: Start.

Step S402: Receive memory information associated with at least one host buffer in a host communication device (e.g., the host communication device 100 in FIG. 1) from the host communication device.

Step S404: Transmit (e.g., Put) data to the host communication device according to the memory information, wherein the data is stored in at least one internal buffer in a memory in the transmitting communication device and the at least one internal buffer corresponds to the at least one host buffer.

Step S406: Transmit a first indication indicating a transmission completion of the data to a receiving communication device (e.g., the receiving communication device 120 in FIG. 1), after transmitting the data to the host communication device.

Step S408: Receive a second indication for recycling the at least one host buffer from the receiving communication device.

Step S410: Recycle the at least one host buffer according to the second indication.

Step S412: End.

The processing circuit in the transmitting communication device is configured to perform steps of the process 40. According to the process 40, the data is transmitted from the transmitting communication device to the receiving communication device via a memory in the host communication device instead of a CPU in the host communication device.

Realization of the process 40 is not limited to the above description. The following embodiments of the invention may be applied to realize the process 40.

In an embodiment of the invention, the processing circuit in the transmitting communication device receives connection information of a connection rule from the host communication device e.g., whenever a connection for the transmitting communication device matches the connection rule. Then, the processing circuit in the transmitting communication device performs an address translation according to the connection information. In an embodiment of the invention, the connection rule is enabled for a direct tethering. In an embodiment of the invention, the connection information comprises at least one source address of the data and at least one destination address of the data. For example, the connection information comprises at least one host address of the memory in the host communication device, at least one internal address of a memory in the transmitting communication device and/or at least one internal address of a memory in the receiving communication device.

In an embodiment of the invention, the step of performing the address translation according to the connection information comprises: allocating a host buffer region in the host communication device and an internal buffer region in the transmitting communication device; storing the data in the at least one internal buffer; translating at least one internal address for the internal buffer region to at least one host address for the host buffer region according to the connection information; assigning the at least one host address to at least one description; and transmitting the at least one description to the host communication device.

In an embodiment of the invention, the host buffer region comprises the at least one host buffer, and the internal buffer region comprises the at least one internal buffer. In an embodiment of the invention, each of the at least one description comprises a pointer of one or multiple host buffers in the host buffer region. That is, a description of the at least one description corresponds to one or multiple host address for the host communication device. In an embodiment of the invention, each of the at least one description is put consecutively (e.g., like a ring buffer) with a fixed entry size in the memory in the host communication device. In an embodiment of the invention, the at least one description is mirrored in memories in the host communication device and the transmitting/receiving communication device. That is, the at least one host buffer corresponds to the at least one internal buffer.

In an embodiment of the invention, the processing circuit in the transmitting communication device transmits the first indication to the receiving communication device according to a signaling mechanism. That is, the transmitting communication device notifies the receiving communication that the data transmission is done by signaling the first indication. In an embodiment of the invention, the processing circuit in the transmitting communication device receives the second indication from the receiving communication device according to the signaling mechanism. That is, the receiving communication device notifies the transmitting communication that the at least one host buffer can be recycled by signaling the second indication. In an embodiment of the invention, the signaling mechanism is a PCIe in-band signaling mechanism. In an embodiment of the invention, the first indication and the second indication are control events.

In an embodiment of the invention, the memory information comprises at least one memory location (e.g., address) of the at least one host buffer. In an embodiment of the invention, the data comprises at least one packet, at least one signal, at least one event, at least one message or at least one command.

Figure 5:
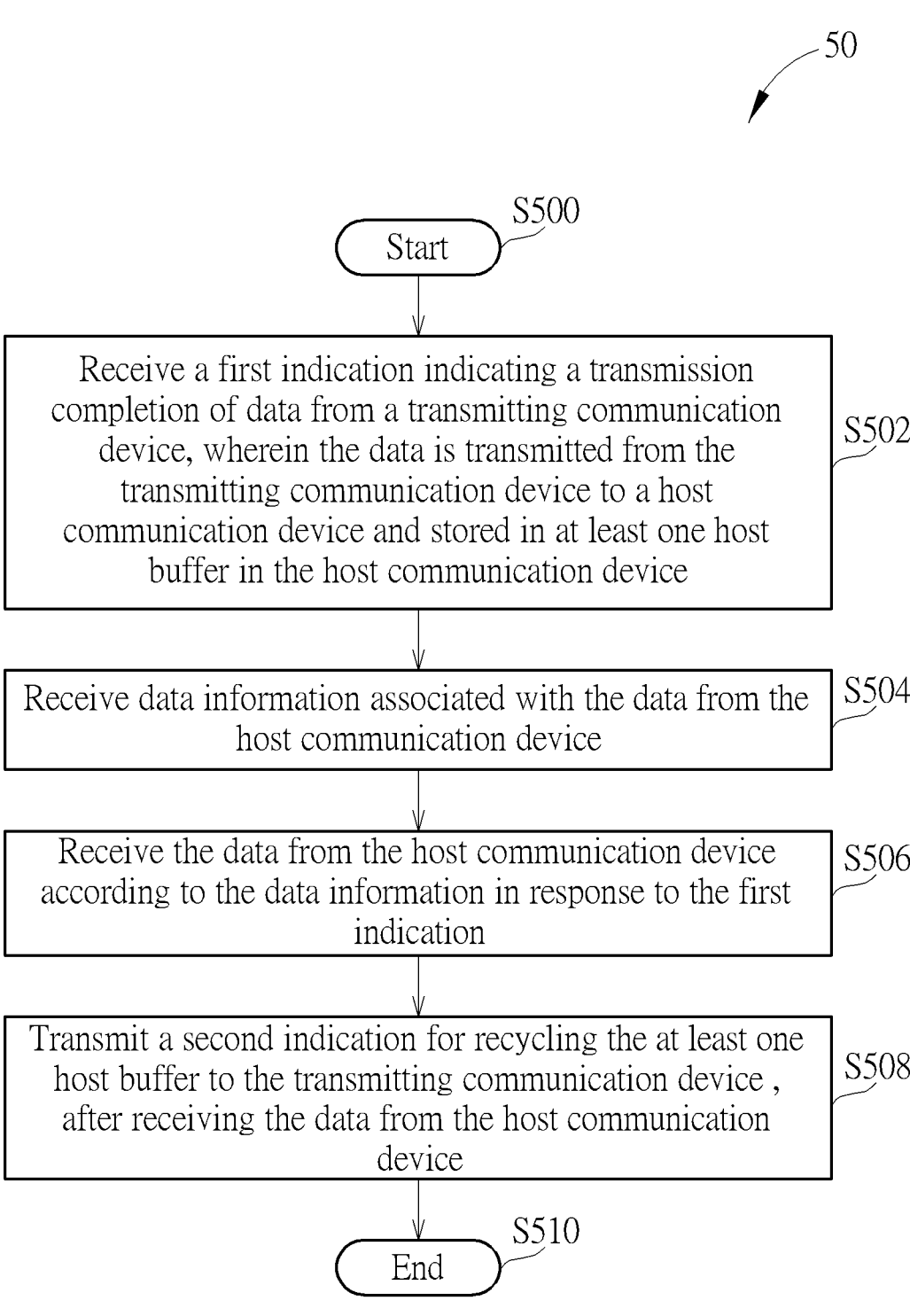
FIG. 5 is a flowchart of a process according to an embodiment of the invention.

FIG. 5 is a flowchart of a process 50 utilized in a receiving communication device (e.g., the receiving communication device 120 in FIG. 1, and more particularly, a processing circuit in the receiving communication device 120) according to an embodiment of the invention, to handling a data transmission. Provided that the result is substantially the same, the steps are not required to be executed in the exact order shown in FIG. 5. The process 50 comprises the following steps:

Step S500: Start.

Step S502: Receive a first indication indicating a transmission completion of data from a transmitting communication device (e.g., the transmitting communication device 110 in FIG. 1), wherein the data is transmitted from the transmitting communication device to a host communication device (e.g., the host communication device 100 in FIG. 1) and stored in at least one host buffer in the host communication device.

Step S504: Receive data information associated with the data from the host communication device.

Step S506: Receive (e.g., read) the data from the host communication device according to the data information in response to the first indication.

Step S508: Transmit a second indication for recycling the at least one host buffer to the transmitting communication device, after receiving the data from the host communication device.

Step S510: End.

The processing circuit in the receiving communication device 120 is configured to perform steps of the process 50. According to the process 50, the data is transmitted from the transmitting communication device to the receiving communication device via a memory in the host communication device instead of a CPU in the host communication device.

Realization of the process 50 is not limited to the above description. The following embodiments of the invention may be applied to realize the process 50.

In an embodiment of the invention, the processing circuit in the receiving communication device receives connection information of a connection rule from the host communication device e.g., whenever a connection for the receiving communication device matches the connection rule. Then, the processing circuit in the receiving communication device performs an address translation according to the connection information. In an embodiment of the invention, the connection rule is enabled for a direct tethering. In an embodiment of the invention, the connection information comprises at least one source address of the data and at least one destination address of the data. For example, the connection information comprises at least one host address of the memory in the host communication device, at least one internal address of a memory in the transmitting communication device and/or at least one internal address of a memory in the receiving communication device.

In an embodiment of the invention, the step of performing the address translation according to the connection information comprises: receiving at least one description from the host communication device; obtaining at least one host address for a host buffer region in the host communication device according to the at least one description; translating the at least one host address to at least one internal address for an internal buffer region in the receiving communication device according to the connection information, wherein the internal buffer region comprises at least one internal buffer; and storing the data in the at least one internal buffer according to the at least one internal address. In an embodiment of the invention, the processing circuit in the receiving communication device gets notified with a control event for the at least one description, before receiving at least one description.

In an embodiment of the invention, each of the at least one description comprises a pointer of one or multiple host buffers in the host buffer region. That is, a description of the at least one description corresponds to one or multiple host address for the host communication device. In an embodiment of the invention, each of the at least one description is put consecutively like a ring buffer with a fixed entry size in the memory in the host communication device. In an embodiment of the invention, the at least one description is mirrored in memories in the host communication device and the transmitting/receiving communication device. That is, the at least one internal buffer corresponds to the at least one host buffer.

In an embodiment of the invention, the processing circuit in the receiving communication device receives the first indication from the transmitting communication device according to a signaling mechanism. That is, the transmitting communication device notifies the receiving communication that the data transmission is done by signaling the first indication. In an embodiment of the invention, the processing circuit in the receiving communication device transmits the second indication to the transmitting communication device according to the signaling mechanism. That is, the receiving communication device notifies the transmitting communication that the at least one host buffer can be recycled by signaling the second indication. In an embodiment of the invention, the signaling mechanism is a PCIe in-band signaling mechanism. In an embodiment of the invention, the first indication and the second indication are control events.

In an embodiment of the invention, the data comprises at least one packet, at least one signal, at least one event, at least one message or at least one command. In an embodiment of the invention, the data information comprises a size of the data (e.g., the number of events/packets to receive). In an embodiment of the invention, the processing circuit in the receiving communication device transmits the data to other communication device except the host communication device and the transmitting communication device.

To sum up, the present invention provides communication devices and methods for handling a data transmission. The transmitting communication device transmits (e.g., puts) data to the memory in the host communication device, and the receiving communication device receives (e.g., read) the data from the memory in the host communication device. During the data transmission, the CPU in the host communication device does not wake up. Therefore, the transmitting communication device and the receiving communication device may communicate with each other while the dependency to the host communication device does not have the CPU in the host communication device. The problems of additional power consumption, increased latency and software complexity caused by the CPU in the host communication device may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A host communication device, comprising:

a memory comprising a plurality of host buffers; and a processing circuit, coupled to the memory and configured to execute instructions of:

transmitting memory information associated with at least one host buffer in the memory to a transmitting communication device;

receiving data from the transmitting communication device, wherein the at least one host buffer stores the data according to the memory information after the processing circuit receives the data;

transmitting data information associated with the data to a receiving communication device; and transmitting the data stored in the at least one host buffer to the receiving communication device according to the data information.

2. The host communication device of claim 1, further comprising:

a central processing unit (CPU), coupled to the processing circuit and the memory and configured to be in a power off state when the processing circuit executes the instructions.

3. The host communication device of claim 1, wherein the instructions further comprise:

allocating the at least one host buffer for a communication between the transmitting communication device and the receiving communication device.

4. The host communication device of claim 1, wherein the instructions further comprise:

establishing a first communication channel between the host communication device and the transmitting communication device; and establishing a second communication channel between the host communication device and the receiving communication device.

5. The host communication device of claim 1, further comprising:

a connection tracker, coupled to the processing circuit and configured to determine a connection rule and generate connection information of the connection rule.

6. The host communication device of claim 5, wherein the instructions further comprise:

transmitting the connection information to the transmitting communication device and the receiving communication device.

7. The host communication device of claim 1, wherein the memory information comprises at least one memory location of the at least one host buffer.

8. The host communication device of claim 1, wherein the data information comprises a size of the data.

9. A transmitting communication device, comprising:

a memory comprising a plurality of internal buffers;

a processing circuit, coupled to the memory and configured to execute instructions of:

receiving memory information associated with at least one host buffer in a host communication device from the host communication device;

transmitting data to the host communication device according to the memory information, wherein the data is stored in at least one internal buffer in the memory and the at least one internal buffer corresponds to the at least one host buffer;

transmitting a first indication indicating a transmission completion of the data to a receiving communication device, after transmitting the data to the host communication device;

receiving a second indication for recycling the at least one host buffer from the receiving communication device; and recycling the at least one host buffer according to the second indication.

10. The transmitting communication device of claim 9, wherein the instructions further comprise:

receiving connection information of a connection rule from the host communication device; and performing an address translation according to the connection information.

11. The transmitting communication device of claim 10, wherein the instruction of performing the address translation according to the connection information comprises:

allocating a host buffer region in the host communication device and an internal buffer region in the transmitting communication device;

storing the data in the at least one internal buffer;

translating at least one internal address for the internal buffer region to at least one host address for the host buffer region according to the connection information;

assigning the at least one host address to at least one description; and transmitting the at least one description to the host communication device.

12. The transmitting communication device of claim 11, wherein the host buffer region comprises the at least one host buffer, and the internal buffer region comprises the at least one internal buffer.

13. The transmitting communication device of claim 11, wherein each of the at least one description comprises a pointer of one or multiple host buffers in the host buffer region.

14. The transmitting communication device of claim 9, wherein the memory information comprises at least one memory location of the at least one host buffer.

15. A receiving communication device, comprising:

a memory comprising a plurality of internal buffers;

a processing circuit, coupled to the memory and configured to execute instructions of:

receiving a first indication indicating a transmission completion of data from a transmitting communication device, wherein the data is transmitted from the transmitting communication device to a host communication device and stored in at least one host buffer in the host communication device;

receiving data information associated with the data from the host communication device;

receiving the data from the host communication device according to the data information in response to the first indication; and transmitting a second indication for recycling the at least one host buffer to the transmitting communication device, after receiving the data from the host communication device.

16. The receiving communication device of claim 15, wherein the instructions further comprise:

receiving connection information of a connection rule from the host communication device; and performing an address translation according to the connection information.

17. The receiving communication device of claim 16, wherein the instruction of performing the address translation according to the connection information comprises:

receiving at least one description from the host communication device;

obtaining at least one host address for a host buffer region in the host communication device according to the at least one description;

translating the at least one host address to at least one internal address for an internal buffer region in the receiving communication device according to the connection information, wherein the internal buffer region comprises at least one internal buffer; and storing the data in the at least one internal buffer according to the at least one internal address.

18. The receiving communication device of claim 17, wherein each of the at least one description comprises a pointer of one or multiple host buffers in the host buffer region.

19. The receiving communication device of claim 17, wherein the at least one internal buffer corresponds to the at least one host buffer.

20. The receiving communication device of claim 15, wherein the data information comprises a size of the data.

* * * * *